(12) United States Patent
Jochem

(10) Patent No.: US 7,097,790 B2
(45) Date of Patent: Aug. 29, 2006

(54) METHOD OF PRODUCING A CONTAINER CLOSURE

(75) Inventor: David J. Jochem, Evansville, IN (US)

(73) Assignee: Berry Plastics Corporation, Evansville, IN (US)

( * ) Notice: Subject to any disclaimer, the term of this patent is extended or adjusted under 35 U.S.C. 154(b) by 316 days.

(21) Appl. No.: 10/669,198

(22) Filed: Sep. 24, 2003

(65) Prior Publication Data

US 2005/0062183 A1 Mar. 24, 2005

(51) Int. Cl.
*B29C 43/18* (2006.01)
(52) U.S. Cl. .......... 264/40.4; 264/148; 264/247; 264/268; 264/273; 264/274; 264/275
(58) Field of Classification Search ........ 264/268, 264/273, 274, 275, 247; 215/295, 341, 350
See application file for complete search history.

(56) References Cited

U.S. PATENT DOCUMENTS

| | | | |
|---|---|---|---|
| 2,752,059 A | 6/1956 | Schneider | |
| 2,768,762 A | 10/1956 | Guinet | |
| 3,095,991 A | 7/1963 | Paniagua | |
| 3,195,754 A | 7/1965 | Brockett | |
| 3,628,704 A | 12/1971 | Corsette | |
| 4,088,730 A * | 5/1978 | Wilde | 264/268 |
| 4,312,824 A * | 1/1982 | Mori et al. | 264/135 |
| 4,343,754 A * | 8/1982 | Wilde et al. | 264/154 |
| 4,379,512 A | 4/1983 | Ohmi | |
| 4,429,802 A | 2/1984 | Marks | |
| 4,488,676 A | 12/1984 | Halliday | |
| 4,497,765 A * | 2/1985 | Wilde et al. | 264/268 |
| 4,625,875 A | 12/1986 | Carr et al. | |
| 4,658,976 A | 4/1987 | Pohlenz | |
| 4,741,447 A | 5/1988 | John | |
| 4,744,481 A | 5/1988 | Morgan, Jr. | |
| 4,878,589 A | 11/1989 | Webster et al. | |
| 5,042,680 A | 8/1991 | Argudo et al. | |
| 5,213,224 A | 5/1993 | Luch | |
| 5,439,124 A | 8/1995 | Mock | |
| 5,553,727 A | 9/1996 | Molinaro | |
| 5,762,218 A | 6/1998 | Sachau | |
| 5,979,690 A | 11/1999 | Hartley | |
| 6,142,325 A * | 11/2000 | Chomik | 215/343 |
| 6,371,318 B1 * | 4/2002 | Riffer | 215/347 |
| 6,481,589 B1 * | 11/2002 | Blomdahl et al. | 215/303 |
| 6,696,123 B1 * | 2/2004 | Hock et al. | 428/36.6 |
| 2002/0113032 A1 * | 8/2002 | Blomdahl et al. | 215/341 |

FOREIGN PATENT DOCUMENTS

| | | |
|---|---|---|
| EP | 1065149 A2 | 1/2001 |
| FR | 2593148 | 1/1987 |
| FR | 2759351 | 2/1997 |

* cited by examiner

*Primary Examiner*—Edmund H. Lee
(74) *Attorney, Agent, or Firm*—Barnes & Thornburg LLP

(57) ABSTRACT

A method of producing a liquid container closure includes the acts of providing a cap and molding a cap liner on an interior surface of the cap and a grip portion on an exterior surface of the cap.

15 Claims, 6 Drawing Sheets

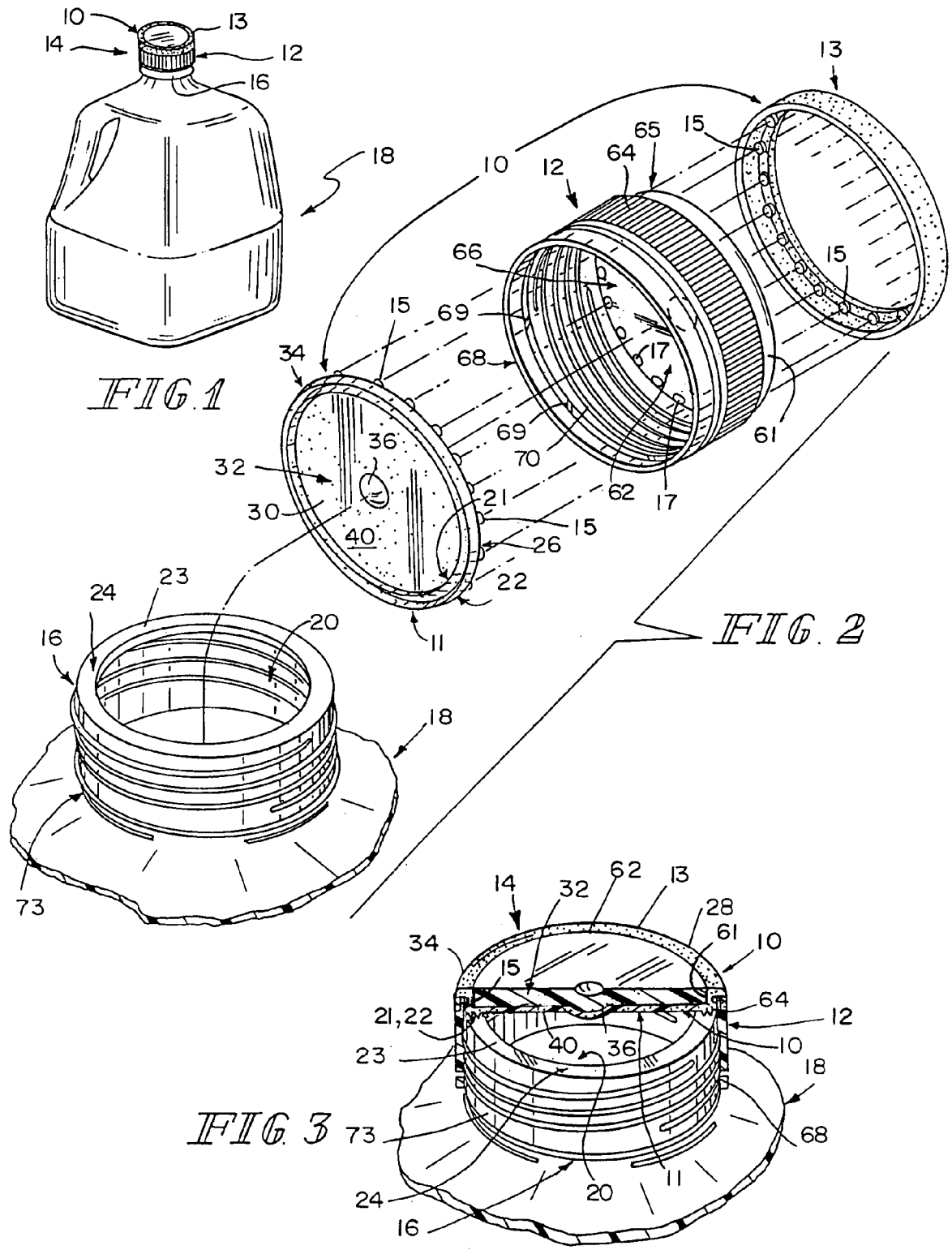

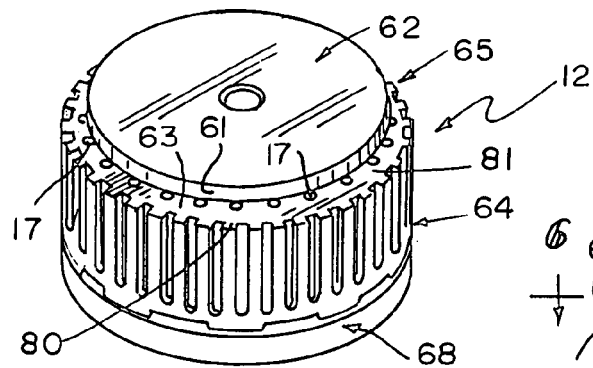
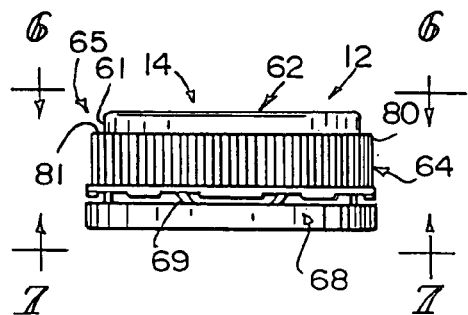
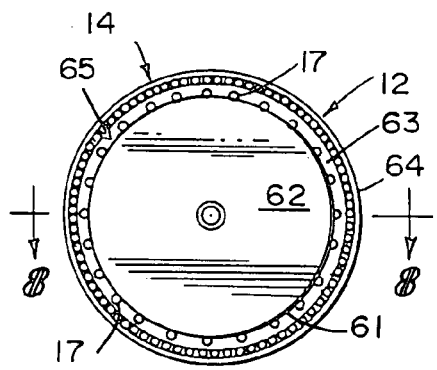
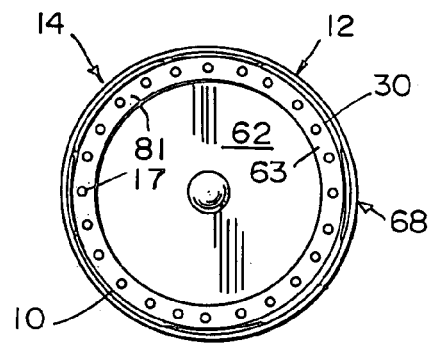
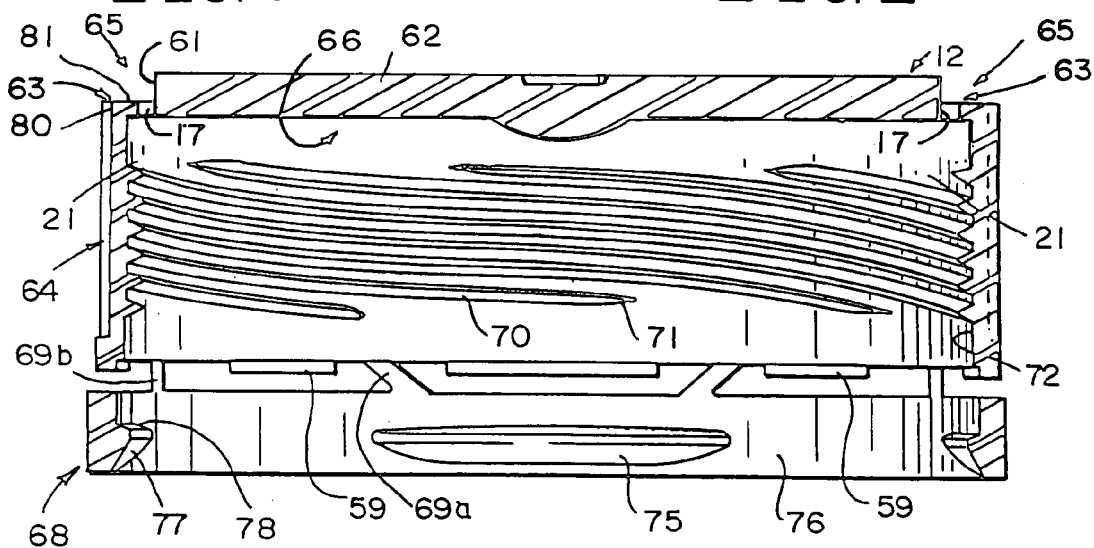

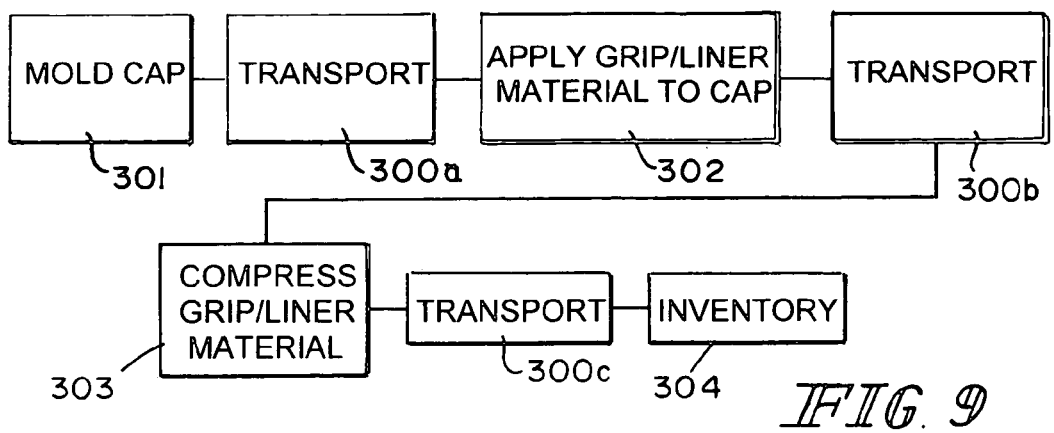
FIG. 9
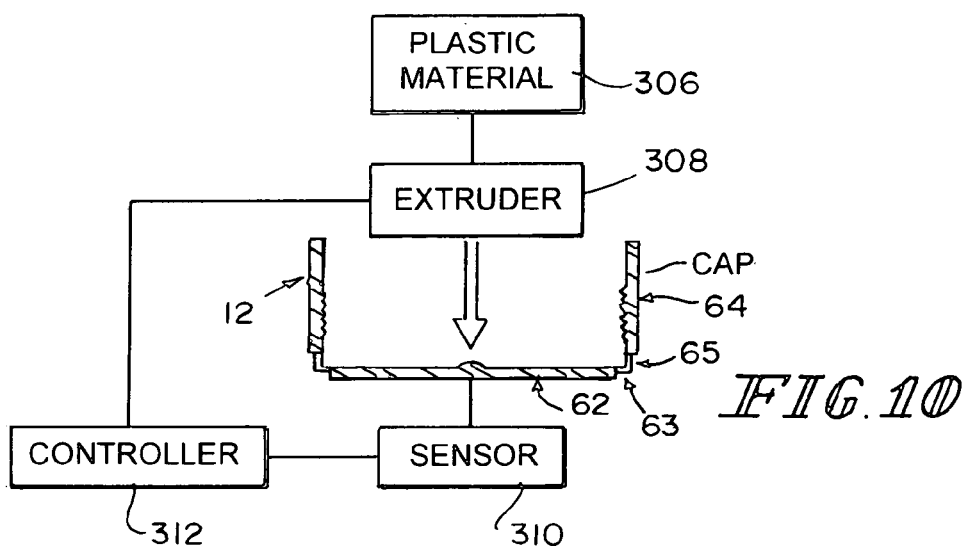
FIG. 10
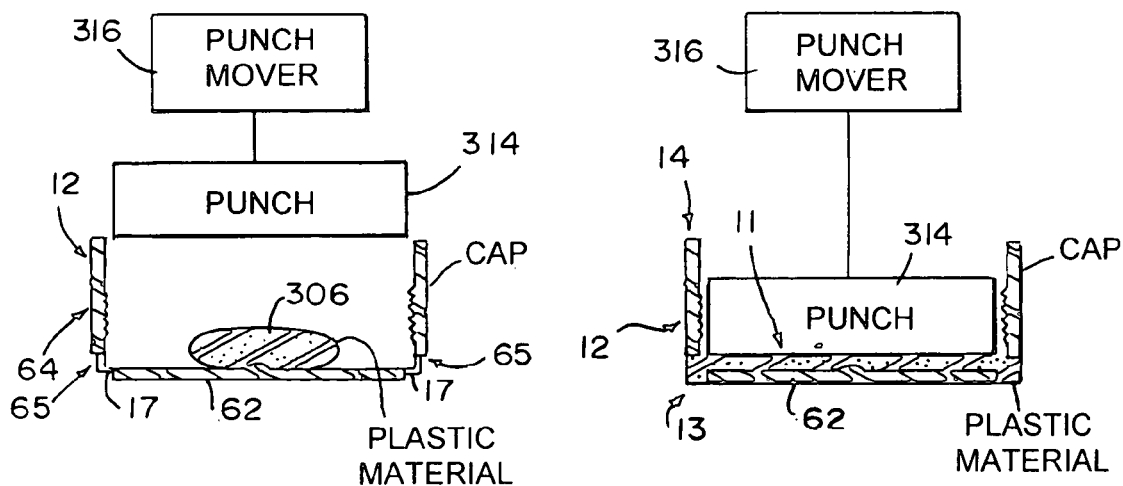
FIG. 11
FIG. 12

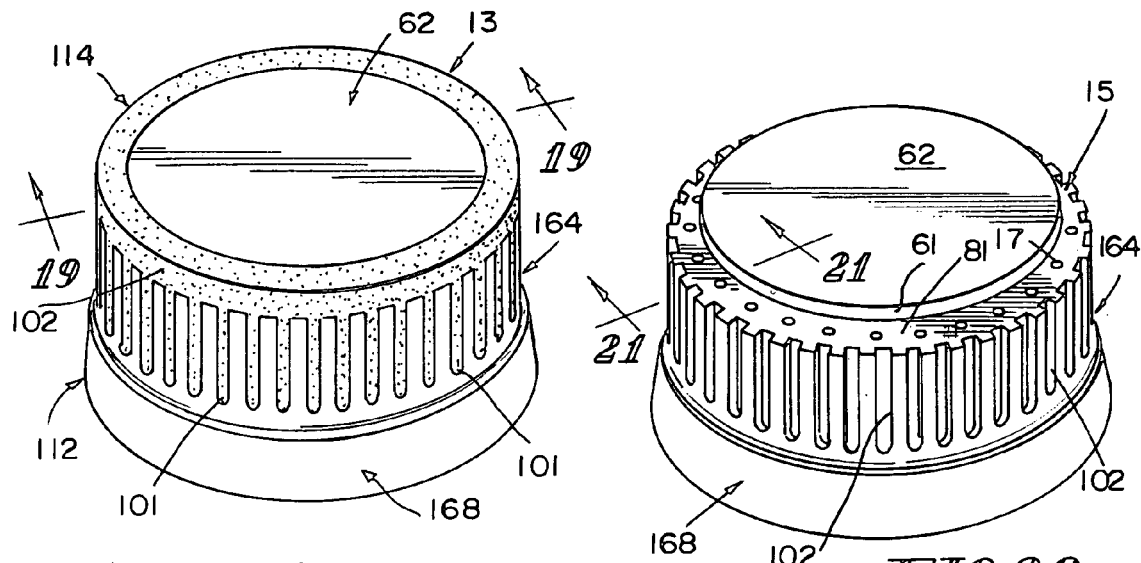
FIG. 18
FIG. 20
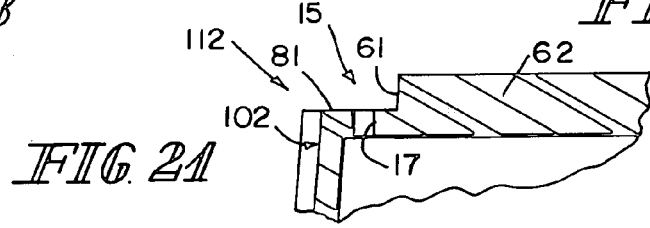
FIG. 21
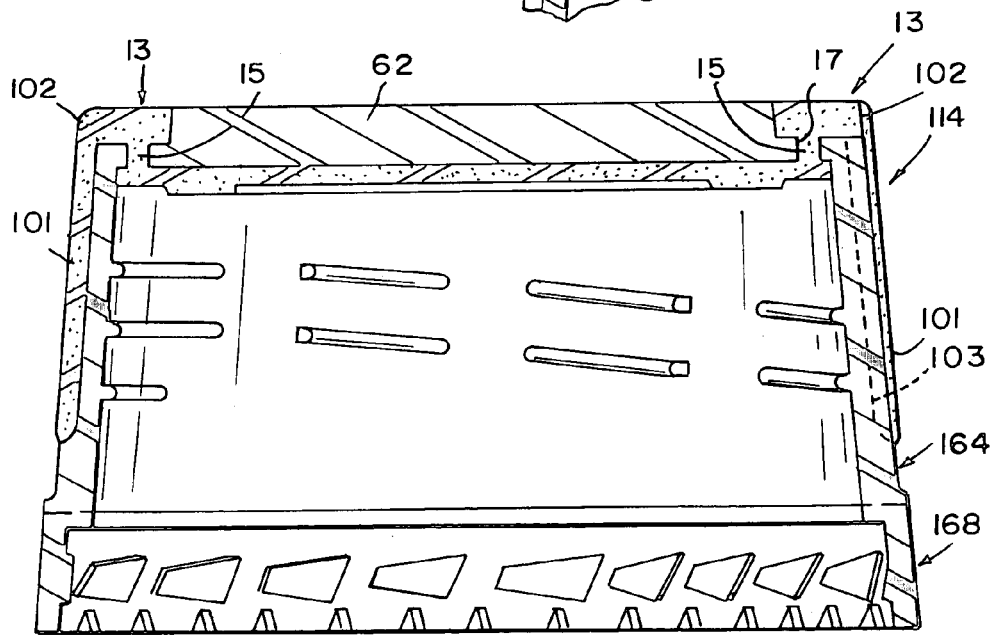
FIG. 19

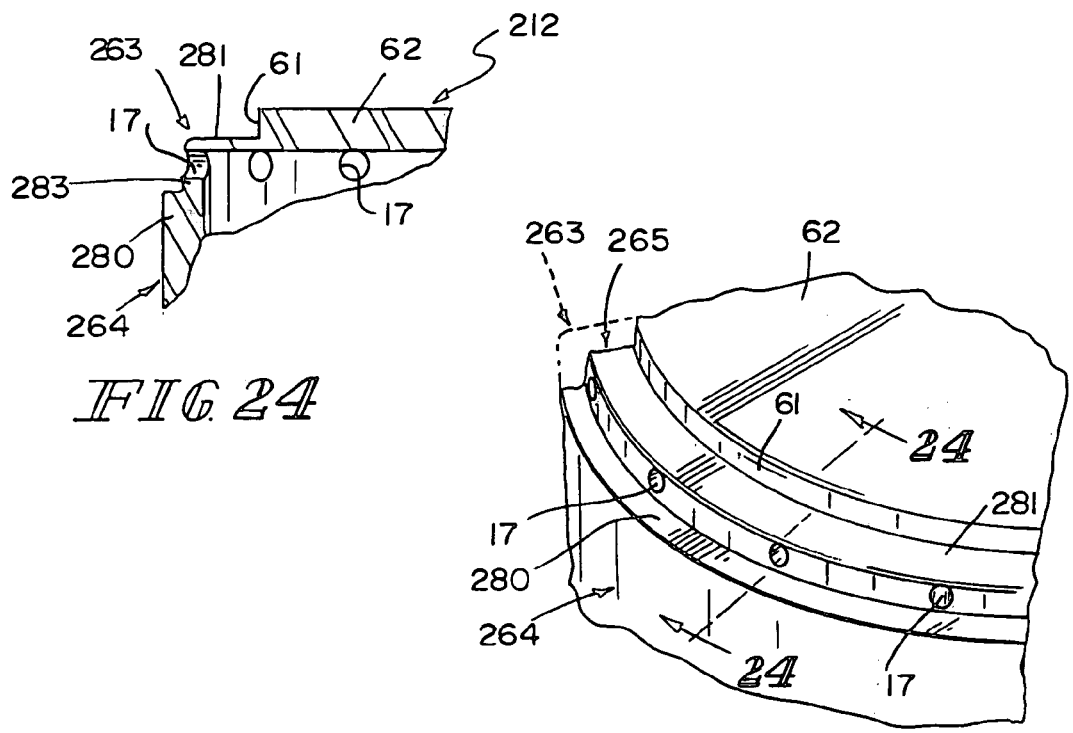
FIG. 24
FIG. 23
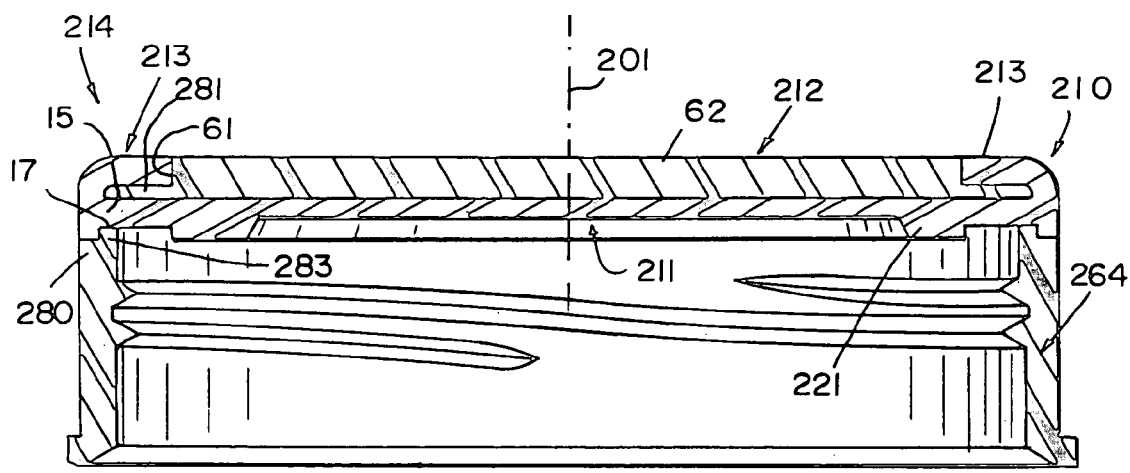
FIG. 22

METHOD OF PRODUCING A CONTAINER CLOSURE

BACKGROUND AND SUMMARY

The present disclosure relates to a closure for a liquid container, and particularly to a closure configured to close an open mouth formed in a threaded neck of a beverage container. More particularly, the present disclosure relates to a method of producing a container closure including a sealing liner.

Milk, juice, and other beverages are dispensed into jugs or containers at a bottling plant. A closure is then mounted on the container neck to close a liquid inlet/outlet opening formed in the container neck. Closures are sized and shaped to mate with container necks to minimize leakage of liquid from a closed container during shipment of filled containers from a bottling plant to a wholesale or retail store.

Some beverage containers, such as one gallon milk or orange juice jugs, are extrusion blow-molded using a polyethylene plastics material. Other beverage containers of the type used to store "sport" drinks are stretch blow-molded using a PET plastics material. In most cases, external threads are formed on the open-mouth necks of these containers to mate with a container closure formed to include mating internal threads.

Container closures are usually made of low-density polyethylene (LDPE), high-density polyethylene (HDPE), or polypropylene (PP). Some closures are configured to be snapped onto the neck using a capping machine at the bottling plant and screwed on and off the neck by a consumer at home or elsewhere. Such "snap-on, screw-off" style closures often include many fine interior threads with many separate thread leads to enable a bottler to close the open mouth formed in the container neck by applying downward pressure on the closure to "snap" it into place on the neck of a filled container. Nevertheless, a consumer is able to twist and unscrew the threaded closure to remove it from the threaded neck of the container to access the liquid in the container.

According to the present disclosure, a method of producing a liquid container closure comprises the steps for providing a cap and molding a monolithic compliant member on the cap. The monolithic compliant member includes a cap liner located on an interior surface of the cap and adapted to mate with a neck of a liquid container received in an interior region of the cap. The monolithic compliant member also includes a grip portion on the exterior surface of the cap.

Additional features of the present disclosure will become apparent to those skilled in the art upon consideration of the following detailed description of preferred embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a closure in accordance with a first embodiment of the present disclosure showing a cap mounted on a neck of a container and showing a grip ring carried in an annular channel formed in a top perimeter portion of the cap to form the closure;

FIG. 2 is an exploded perspective assembly view of the closure and container neck of FIG. 1 showing formation of a series of extrusion holes formed in a top surface of the cap and showing a monolithic compliant member comprising a grip ring (to the right of the cap) and a cap liner coupled to the grip ring by a series of circumferentially spaced-apart extrusion posts that are arranged to extend through the extrusion holes formed in the cap when the monolithic compliant member is overmolded onto the cap as suggested in FIGS. 9–12 to produce the closure shown in FIGS. 1 and 13–17;

FIG. 3 is a perspective view similar to FIG. 2 showing the closure mounted on the container neck and showing the monolithic compliant member formed on the cap to provide an inner cap liner coupled to an outer grip ring by extrusion posts;

FIG. 4 is a perspective view of the cap of FIGS. 1–3;

FIG. 5 is a side elevation view of the cap of FIG. 4;

FIG. 6 is a top plan view of the cap of FIGS. 4 and 5;

FIG. 7 is a bottom view of the cap of FIGS. 4–6;

FIG. 8 is an enlarged sectional view taken along line 8—8 of FIG. 6;

FIG. 9 is a block diagram illustrating a process for using compression molding apparatus to form a monolithic compliant member comprising a grip ring and a cap liner on a cap to produce a closure;

FIG. 10 is a diagrammatic view showing a system for applying a plastics material to the cap preparatory to compression of that plastics material to form a monolithic grip ring and cap liner on the cap;

FIG. 11 is a diagrammatic view showing components in a compression molding apparatus before movement of a punch to compress plastics material applied to the cap;

FIG. 12 is a diagrammatic view similar to FIG. 11 after movement of the punch to compress plastics material applied to the cap to form a monolithic grip ring and cap liner component on the cap;

FIG. 18 is a perspective view of a closure in accordance with another embodiment of the disclosure;

FIG. 19 is a sectional view taken along line 19—19 of FIG. 18;

FIG. 20 is a perspective view of a closure base included in the closure of FIG. 14 before a monolithic compliant member is overmolded onto the cap;

FIG. 21 is a sectional view taken along line 21—21 of FIG. 20;

FIG. 22 is a sectional view (similar to FIG. 19) of a closure in accordance with another embodiment of the disclosure;

FIG. 23 is a partial perspective view of a cap included in the closure of FIG. 22 before a monolithic compliant member is overmolded onto the cap; and FIG. 24 is a sectional view taken along line 24—24 of FIG. 23.

DETAILED DESCRIPTION

Figure 13:
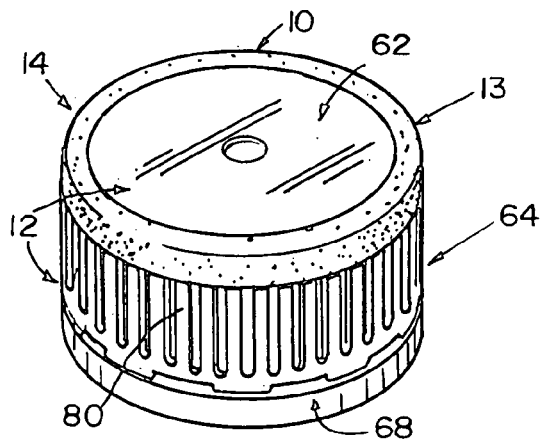
FIG. 13 is a perspective view of the closure of FIGS. 1–3.
Figure 14:
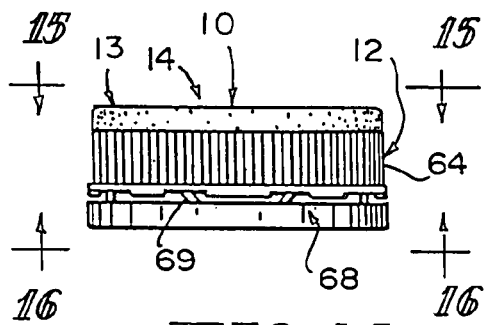
FIG. 14 is a side elevation view of the closure of FIG. 13.
Figure 15:
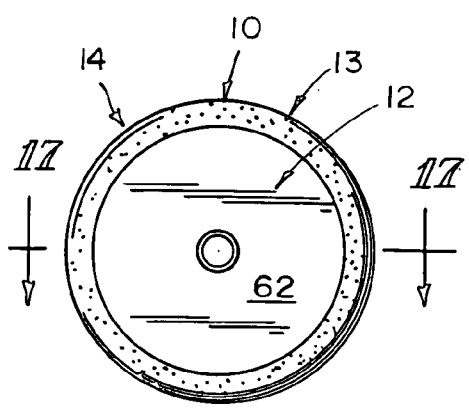
FIG. 15 is a top plan view of the closure of FIGS. 13 and 15.
Figure 16:
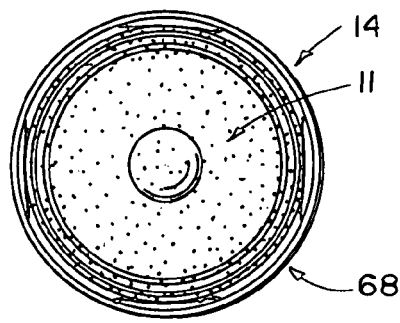
FIG. 16 is a bottom view of the closure of FIGS. 13–15.
Figure 17:
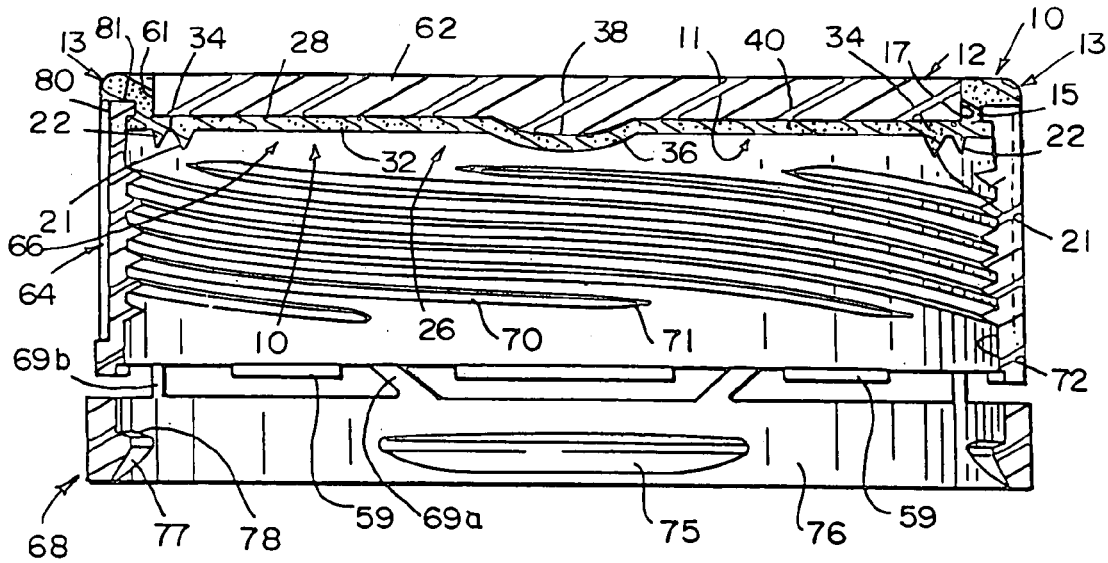
FIG. 17 is an enlarged sectional view taken along line 17—17 of FIG. 15 showing the formation of the monolithic compliant member on the cap to form the inner cap liner and the outer grip ring.

A monolithic compliant member 10 is coupled to a cap 12 to provide a liquid container closure 14 as suggested, for example, in FIGS. 1–3 and FIGS. 13–17. Closure 14 mounts on a neck 16 of a container 18 to close an open mouth 20 formed in neck 16. An illustrative compression-molding process for forming monolithic compliant member 10 on cap 12 is shown in FIGS. 9–12.

Monolithic compliant member 10 includes a cap liner 11, a grip portion 13 illustratively shaped to form a ring, and a series of posts 15 coupled at one end to cap liner 11 and at another end to grip portion 13 as suggested, for example, in FIGS. 2 and 3. Each post 15 is arranged to extend through a companion hole 17 formed in cap 12 to tether cap liner 11 to grip portion 13 to retain monolithic compliant member 10 on cap 12 in a manner shown, for example, in FIG. 3. It is within the scope of this disclosure to form grip portion 13 in suitable shapes other than a ring.

Monolithic compliant member 10 is made of a compliant material that yields elastically when a force is applied and thus is deformable to allow cap liner 11 to establish a sealed barrier located, for example, between cap 12 and neck 16 of container 18 upon installation of closure 14 on neck 16 as suggested in FIGS. 1 and 3. Grip portion 13 is made of that same compliant material. One characteristic of the compliant material is that it is adapted to move into and through voids formed in cap 12 or associated with molds used to overmold monolithic compliant member 10 onto cap 12. In one embodiment, the compliant material used to form grip portion 13 is "softer" than the material used to form cap 12. In an illustrative embodiment, grip portion 13 provides a high-friction, low-abrasion surface for contact with an end user during contact with closure 14 to open and close container 18. It is within the scope of this disclosure to use a material having one color to form monolithic compliant member 10 and a material having another color to form cap 12.

In the illustrated embodiment, cap liner 11 includes concentric first and second seal rings 21, 22 that contact an upwardly facing surface 23 of an annular rim 24 included in neck 16 to establish an "annular seal" therebetween when cap 12 is coupled to neck 16 (as shown in FIGS. 1, 3, and 12) so that leakage of liquid (not shown) from container 18 through open mouth 20 is blocked. Cap liner 11 also includes a mount 26 having a top surface 28 arranged to mate with cap 12 and an opposite bottom surface 30 arranged to support the concentric first and second seal rings 21, 22 as suggested in FIGS. 4–6. In the illustrated embodiment, mount 26 is shaped to provide a round disk. It is within the scope of this disclosure to omit seal rings 21, 22 (and use a portion of mount 26 to effect a seal) or employ one or more seal rings or members in cap liner 11.

Mount 26 of cap liner 11 includes a round inner web 32 and an annular outer web 34 surrounding round inner web 32 as suggested in FIGS. 2 and 19. Concentric first and second seal rings 21, 22 depend from annular outer web 34 as suggested in FIG. 19. Inner web 32 includes an outer peripheral portion terminating at first seal ring 21 to cause first seal ring 21 to surround inner web 32. Inner web 32 includes a central dome 36 formed to include a dome receiver cavity 38 having an opening in top surface 28. Inner web 32 also includes a web membrane 40 arranged to surround central dome 36 and extend radially outwardly from central dome 36 to first seal ring 21.

Monolithic compliant member 10 is formed from a compliant material with a preferred Shore A durometer hardness of 58±3, although materials with hardness readings ranging from 24 to 95 are suitable. The preferred compliant material is sold as ALPHA SEAL #01-372, available from AlphaGary Corporation of Leominster, Mass. Examples of suitable materials for use in monolithic compliant member 10 include synthetic or natural rubber, ethylene vinyl alcohol (EVA), linear low-density polyethylene, thermoplastic elastomers, and/or soft polypropylene. Optionally, the material may be a laminate of one or more of such compounds or mixtures of one or more of such compounds.

Cap 12 includes a top wall 62, a grip support 63 extending around top wall 62, and an annular skirt 64 depending from grip support 63 to form an interior region 66 of cap 12 as shown, for example, in FIGS. 2 and 10–12. Cap 12 also includes, for example, a tamper band 68 coupled to annular skirt 64 by means of frangible bridges 69 or other suitable frangible connectors. It is within the scope of this disclosure to omit tamper band 68 from cap 12.

Grip support 63 and top wall 62 cooperate to form a channel 65 receiving grip portion 13 of monolithic compliant member 10 as shown, for example, in FIG. 4. Grip portion 13 is located outside of interior region 66 of cap 12 and arranged to engage an exterior surface of cap 12 as suggested, for example, in FIG. 13. In the illustrated embodiment, that exterior surface is defined by portions of grip support 63 and top wall 62. As suggested in FIGS. 1–4, grip support 63 and a perimeter edge 61 of top wall 62 cooperate to form an annular channel 65 and grip portion 13 is ring-shaped and located in annular channel 65. It is within the scope of this disclosure to form grip portion 13 to establish an "endless" grip ring (as illustrated in FIGS. 1 and 2) or as one or more segments located on an exterior surface of cap 12 and linked to cap liner 11.

Referring now to FIGS. 4–6 and 8, in the illustrated embodiment, annular skirt 64 includes an upper edge 80. Grip support 63 includes an annular lateral wall 81 extending away from perimeter edge 61 of top wall 62 and mating with annular upper edge 80 of annular skirt 64. Annular upper edge 80 and an exterior surface of annular lateral wall 81 cooperate to define a boundary of annular channel 65 formed in cap 12 and engage grip ring 13 located in annular channel 65 as suggested in FIGS. 2 and 3. Annular skirt 64 is arranged as suggested in FIG. 8 to extend in a vertical direction and annular lateral wall 81 is arranged to extend in a horizontal direction to lie in orthogonal relation to annular skirt 64.

Annular lateral wall 81 of grip support 63 is formed to include "extrusion" holes 17 as suggested in FIGS. 2, 4, 6, 8, and 17. As disclosed herein, plastics material is moved or otherwise extruded through holes 17 during formation of monolithic compliant member 10 on cap 12 to form closure 14.

In an illustrated embodiment suggested in FIGS. 4, 6, and 7, extrusion holes 17 are formed to lie in circumferentially spaced-apart relation to one another in a circular pattern around perimeter edge 61 of top wall 62. It is within the scope of this disclosure to vary, for example, the size, spacing, and number of these extrusion holes 17. Extrusion holes 17 provide passageways through cap 12 for conducting plastics material between annular channel 65 and interior region 66 during creation of monolithic compliant member 10 on cap 12. As suggested in FIGS. 2, 3, and 17, once monolithic compliant member 10 is established on cap 12, extrusion posts 15 extend through extrusion holes 17 to link cap liner 11 to grip portion 13. Each of extrusion posts 15 provides means for tethering grip portion 13 to cap liner 11 to retain monolithic compliant member 10 on cap 12. As suggested in FIG. 2, in one embodiment, extrusion posts 15 are arranged to extend vertically to lie in spaced-apart relation to one another.

In the illustrated embodiment, annular skirt 64 of cap 12 has a total of four threads 70 with four leads 71 formed in the inner surface 72 of annular skirt 64. In this embodiment, the multiple threads and multiple thread leads assist in providing skirt 64 with sufficient flexibility to provide a snap-on/twist-off capability. The multiple threads 70 are preferably sized, angled, and pitched so that they can slide over container neck threads 73 in response to downward axial pressure applied during bottling. A wide variety of numbers of threads having differing length, height, pitch, and angle of opposite faces may be used in skirt 64.

Preferably, cap 12 is made of high-density polyethylene (HDPE) resin having a density of about 0.95. It is further contemplated that caps 12 may be formed from LDPE, a blend or copolymer of LDPE and HDPE polypropylene (PP), or other lightweight, inexpensive thermoplastic materials suitable for use in compression-molding.

As can be best seen in FIGS. 5 and 8, frangible bridges 69 include both angled bridges 69a and vertical bridges 69b connecting annular skirt 64 to tamper band 68. Preferably, band 68 included at least eight bridges, including two pairs of angled bridges and two pairs of vertical bridges, although other combinations of bridges may be used. The lower edge of annular skirt 64 is defined by a shelf extending axially outwardly so that it has a slightly greater exterior diameter than the remainder of annular skirt 64. A plurality of spaced-apart pads 59 extend down from the lower edge of annular skirt 64. The outer diameter of pads 59 preferably match the outer diameter of the band 68. Pads 59 provide a surface for the upper edge of band 68 to bear against when downward axial pressure is applied to the cap during bottling and when upward axial pressure is applied to the bottom edge of band 68 to assist in ejection of skirt 64 from an injection mold.

The exterior and interior diameters of tamper band 68 are slightly larger than those of annular skirt 64 (other than at pads 59) to allow band 68 to fit over annular rim 24 on container neck 16. Band 68 has a plurality of ridges 75 formed on its interior surface 76. Ridges 75 have an angled lower surface 77 and a bridge-severing surface 78 extending transversely from interior surface 50. Lower surface 77 of ridges 75 are angled to ease passage of skirt 64 and band 68 over rim 24 on neck 16 during the application of downward axial pressure on cap 12 in the course of bottling. Bridge-severing surface 78 of ridges 75 are designed to engage rim 24 on neck 16 of container 18 when cap 12 is twisted for removal. The engagement between bridge-severing surface 78 and rim 24 on neck 16 as skirt 64 is lifted and rotated breaks frangible bridges 69 so that band 68 is retained on neck 16 of container 18. Although bridge-severing surface 78 is shown as being disposed on a series of spaced-apart ridges, it is contemplated that a continuous bridge-severing surface could be provided by use of a continuous rim extending transversely from the interior surface of band 68, rather than spaced-apart ridges.

In the embodiment illustrated in FIGS. 18–21, a closure 114 includes a cap 112 and a monolithic compliant member 110 formed to include external grip fingers 101 depending from a radially outwardly facing portion 102 of grip portion 13. Cap 112 includes a top wall 62, an annular skirt 164, and a tamper band 168. Annular skirt 94 is formed to include upright channels 103 for receiving plastics material to define grip fingers 101 therein. Grip fingers 101 are illustratively arranged to lie in circumferentially spaced-apart relation to one another in a frustoconical array as suggested in FIGS. 18 and 19.

In the embodiment illustrated in FIGS. 22–24, a closure 214 includes a cap 212 and a monolithic compliant member 210. In this embodiment, cap 212 includes a grip support 263 including an annular lateral wall 281 and an annular upright wall 283. Annular lateral wall 281 extends from perimeter edge 61 of top wall 62. Annular upright wall 283 extends from the outer edge of annular lateral wall 281 downwardly to mate with an annular upper edge 280 of annular skirt 264. In this embodiment, perimeter edge 61 of top wall 62, exterior surfaces of annular lateral and upright walls 281, 283, and annular upper edge 280 of annular skirt 264 cooperate to define a boundary of annular channel 265 formed in cap 212 and engage grip portion 213 located in annular channel 265.

In the embodiment of FIGS. 22–24, annular upright wall 283 is formed to include extrusion holes 17. Extrusion holes 17 are formed to extend in radially outwardly extending directions from a central vertical axis 201 extending through top wall 62. Each extrusion post 15 extends through one of extrusion holes 17 to tether cap liner 211 to grip portion 213 to retain monolithic compliant member 210 on cap 212. It is within the scope of this disclosure to form extrusion holes 17 in annular lateral wall 281. A sealing ring 221 is included in cap liner 211.

A method of producing a liquid container closure in accordance with the present disclosure comprises the steps for providing a cap 12 having an interior surface defining an interior region 66, an exterior surface lying outside interior region 66, and at least one hole or opening 17 extending from the interior surface to the exterior surface and then moving a plastics material through the at least one hole 17 to create a monolithic compliant member 10 having (1) a cap liner 11 located on the interior surface of cap 12 and adapted to mate with a neck 16 of a liquid container 18 received in interior region 66 of cap 12 and (2) a grip portion 13 on the exterior surface of cap 12. As suggested, for example, in FIGS. 9–12, the moving step includes the steps of applying a plastics material 306 to the interior surface of cap 12 and the compressing plastics material 306 to form cap liner 11 in interior region 66 of cap 12 and to form grip portion 13 on the exterior surface of cap 12. In illustrative embodiments, plastics material used to form monolithic compliant member 10 is heated to a predetermined temperature before it is moved to contact cap 12.

Various illustrative aspects of a compression-molding process for creating a monolithic compliant member on a cap are shown diagrammatically in FIGS. 9–12. As suggested in FIG. 9, a cap (e.g., cap 12) is molded or otherwise formed at a first station 301. Cap 12 is then transported by conveyor 300a to a second station 302 so that a plastics material formable (at a later stage) to establish a monolithic compliant member (e.g., member 10) can be applied to cap 12. Cap 12 and the plastics material applied thereto are then transported by conveyor 300b to a third station 303 so that the plastics material applied to cap 12 can be compressed to form, for example, cap liner 11 in the interior region 66 of cap 12 and form grip portion 13 on an exterior surface of cap 12. A liquid container closure 14 comprising a cap 12, cap liner 11, and grip portion 13 is now transported by conveyor 300c to inventory 304 or other satisfactory destination.

Monolithic compliant member 10 is formed using a compression-molding method which includes extrusion of a plastics material 306 by an extruder 308 (or other suitable dispenser) onto the center of an underside of a cap through a pick-up nozzle provided by extruder 308 as suggested diagrammatically in FIG. 10. A sensor 310 measures the gram weight of the plastics material 306 extruded and provides a signal via controller 312 to cease flow of plastics material 306 from extruder 308 at a predetermined level, typically between 0.440 to 0.460 grams, for a 38 mm opening cap. Cap 12 and plastics material 306 cools during transportation via conveyor 300b to a compression station 303. Just prior to compression, plastics material 306 has cooled to about 215° C. and is semi-solid.

A compression punch 314 is then brought down upon the plastics material 306 under high pressure generated by punch mover 316 as suggested diagrammatically in FIGS. 11 and 12. Compression punch 314 has a profile which is machined to be a mirror image of cap liner 11 having one or more sealing surfaces as described herein. Plastics material 306 illustratively adheres to cap 12 without use of adhesives or any further addition of heat to cap liner 11, cap 12, or grip portion 13. It is within the scope of this disclosure to adhere cap liner 11 and grip portion 13 to cap 12 so as to cause cap liner 11 and grip portion 13 to hold fast or stick onto cap 12 by or as if by gluing, suction, grasping, or fusing. An illustrative apparatus for performing this method of forming a monolithic compliant member is in the KDP50-24 Plastic Liner Molding Machine sold by Oberburg Engineering AG, Ementalstrasse 137, CH-3414, Oberburg, Switzerland. Another illustrative machine would be a Sacmi lining machine PMV238 available from Sacmi of Italy.

Plastics material 306 is applied to the interior surface of cap 12 as suggested in FIG. 11 and then compressed as suggested in FIG. 12 to form cap liner 11 in interior region 66 of cap 12 and form grip portion 36 on the exterior surface of cap 12. The applying step includes the steps of extruding plastics material 306 onto the interior surface of cap 12, determining the weight of plastics material 306 being extruded onto the interior surface of cap 12 and ceasing the extruding step once the weight of plastics material 306 extruded onto the interior surface reaches a predetermined weight detected during the determining step as suggested in FIGS. 10 and 11. Cap 12 includes a top wall 62 and an annular skirt 64 cooperating with top wall 62 to define interior region 66 and plastics material 306 is applied to a portion of the interior surface located on top wall 62 as suggested in FIG. 11. In the applying step, for example, a molten plastics material is extruded, then cut to form a molten "pellet," and the pellet is placed on cap 12 and arranged to be compressed.

As suggested in FIG. 12, punch 314 is moved by punch mover 316 into interior region 66 of cap 12 to form cap liner 11 on the interior surface and to move plastics material 306 through an opening 17 formed in cap 12 and plastics material 306 moved through the opening is collected to establish grip portion 13 on the exterior surface of cap 12.

What is claimed is:

1. A method of producing a liquid container closure comprising the acts of providing a cap having an interior surface defining an interior region, an exterior surface lying outside the interior region, and at least one hole extending from the interior surface to the exterior surface and moving a plastics material through the at least one hole to create a monolithic compliant member having a cap liner located on the interior surface of the cap and adapted to mate with a neck of a beverage container received in the interior region of the cap and a grip portion on the exterior surface of the cap wherein the moving act comprises applying the plastics material to the interior surface of the cap and then compressing the plastics material to form the cap liner in the interior region of the cap and form the grip portion of the exterior surface on the cap.

2. A method of producing a liquid container closure comprising the acts of providing a cap having an interior surface defining an interior region, an exterior surface lying outside the interior region, and at least one hole extending from the interior surface to the exterior surface and moving a plastics material through the at least one hole to create a monolithic compliant member having a cap liner located on the interior surface of the cap and adapted to mate with a neck of a beverage container received in the interior region of the cap and a grip portion on the exterior surface of the cap, wherein the moving act comprises applying the plastics material to the interior surface of the cap and then compressing the plastics material to form the cap liner in the interior region of the cap and form the grip portion of the exterior surface on the cap, and wherein the applying act comprises extruding a plastics material onto the interior surface of the cap, determining the weight of the plastics material being extruded onto the interior surface of the cap, and ceasing the extruding step once the weight of plastics material extru-ded onto the interior surface reaches a predetermined weight detected during the determining step.

3. The method of claim 1, wherein the cap includes a top wall and an annular skirt cooperating with the top wall to define the interior region and the plastics material is applied to a portion of the interior surface located on the top wall.

4. The method of claim 1, wherein the cap is formed at a first station and the method further comprises, in series, transporting the cap from the first station to a second station, carrying out the applying step at the second station, transporting the cap and the plastics material on the interior surface of the cap to a third station, and carrying out the compressing step at the third station.

5. The method of claim 4, wherein the applying act comprises extruding a plastics material onto the interior surface of the cap, determining the weight of the plastics material being extruded onto the interior surface of the cap, and ceasing the extruding step once the weight of plastics material extruded onto the interior surface reaches a predetermined weight detected during the determining step.

6. A method of producing a liquid container closure comprising providing a cap having an interior surface defining an interior region, an exterior surface lying outside the interior region and an opening connecting the interior and exterior surfaces, and compressing a plastics material located in the interior region and forcina some plastics material through the opening to create a monolithic compliant member having a cap liner located on the interior surface of the cap and adapted to mate with a neck of a beverage container received in the interior region of the cap and a grip portion on the exterior surface of the cap.

7. The method of claim 6, wherein the compressing act includes the steps of moving a punch into the interior region of the cap to form the cap liner on the interior surface and to move plastics material through the opening formed in the cap and collecting plastics material moved through the opening to establish the grip portion on the exterior surface of the cap.

8. A method of producing a liquid container closure comprising providing a cap having an interior surface defining an interior region and an exterior surface lying outside the interior region and compressing a plastics material located in the interior region to create a monolithic compliant member having a cap liner located on the interior surface of the cap and adapted to mate with a neck of a beverage container received in the interior region of the cap and a grip portion on the exterior surface of the cap, wherein the compressing act includes the steps of moving a punch into the interior region of the cap to form the cap liner on the interior surface and to move plastics material through an opening formed in the cap and collecting plastics material moved through the opening to establish the grip portion on the exterior surface of the cap, and further comprising the step of applying the plastics material to the interior surface before the moving and collecting steps and wherein the applying step includes the steps of extruding a plastics material onto the interior surface of the cap, determining the weight of the plastics material being extruded onto the interior surface of the cap, and ceasing the extruding step once the weight of plastics material extruded onto the interior surface reaches a predetermined weight detected during the determining step.

9. The method of claim 8, wherein the cap includes a top wall and an annular skirt cooperating with the top wall to define the interior region and the plastics material is applied to a portion of the interior surface located on the top wall.

10. The method of claim 8, wherein the cap is formed at a first station and the method further comprises the steps of, in series, transporting the cap from the first station to a second station, carrying out the applying step at the second station, transporting the cap and the plastics material on the interior surface of the cap to a third station, and carrying out the moving step at the third station.

11. The method of claim 6, further comprising the step of applying the plastics material to the interior surface before the compressing step and wherein the applying step includes the steps of extruding a plastics material onto the interior surface of the cap, detennining the weight of the plastics material being extruded onto the interior surface of the cap, and ceasing the extruding step once the weight of plastics material extruded onto the interior surface reaches a predetermined weight detected during the determining step.

12. A method of producing a liquid container closure comprising the acts of providing a cap having an interior surface defining an interior region, an exterior surface lying outside the interior region, and holes extending from the interior surface to the exterior surface and compressing a plastics material on the cap interior surface through the holes to create a monolithic compliant member having a cap liner located on the interior surface of the cap and adapted to mate with a neck of a beverage container received in the interior region of the cap and a grip portion on the exterior surface of the cap.

13. The method of claim 12, wherein there are at least ten holes in the cap between the interior surface and exterior surface and the cap liner and the grip portion are joined through these holes.

14. The method of claim 12, wherein there are at least four holes in the cap between the interior surface and exterior surface and the cap liner and the grip portion are joined through these holes.

15. A method of producing a liquid container closure comprising the acts of providing a cap having an interior surface defining an interior region, an exterior surface lying outside the interior region, and holes extending from the interior surface to the exterior surface and moving a plastics material through the holes to create a monolithic compliant member having a cap liner located on the interior surface of the cap and adapted to mate with a neck of a beverage container received in the interior region of the cap and a grip portion on the exterior surface of the cap, wherein a pellet of a predetermined amount is placed on the interior surface and the pellet is compressed during the moving step forcing some plastics material through at least some of the holes to create the cap liner and the grip portion.

* * * * *